Sept. 20, 1971           V. V. IDEL           3,605,529
METHOD OF STOPPING MACHINE FOR SHARPENING AND SETTING SAW TEETH
Filed Feb. 11, 1970
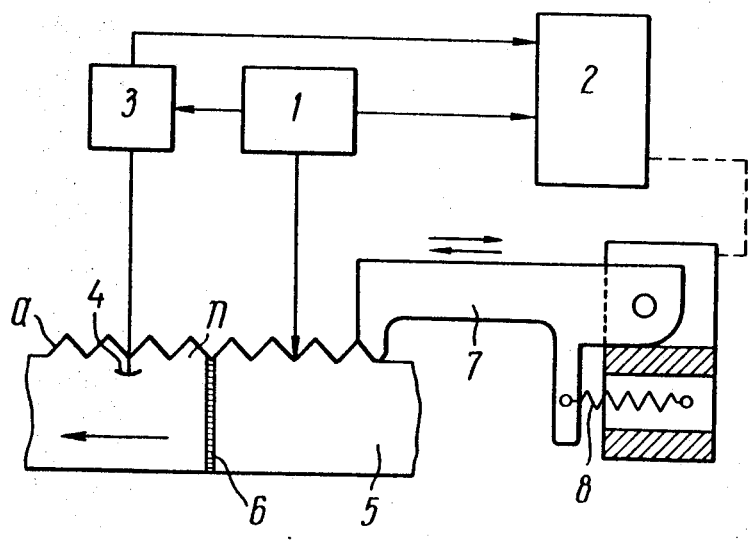

United States Patent Office 3,605,529
Patented Sept. 20, 1971

3,605,529
METHOD OF STOPPING MACHINE FOR SHARPENING AND SETTING SAW TEETH
Vladimir Viktorovich Idel, Gorkovskoi oblast., ulitsa Graftio 15, kv. 6, Zavolzhie, U.S.S.R.
Filed Feb. 11, 1970, Ser. No. 10,393
Claims priority, application U.S.S.R., Feb. 19, 1969, 1,304,933
Int. Cl. B23d 63/00
U.S. Cl. 76—112                                    1 Claim

ABSTRACT OF THE DISCLOSURE

A method of stopping the machine adapted for grinding and setting saw teeth, according to which an electrical-insulation coating is provided on the saw band, and the saw band is electrically connected between the power supply source of the machine drive and this drive, said electrical connection being effected by means of a slidable contact which, when encountering said insulation coating, interrupts the power supply circuit of the machine drive.

---

The present invention relates to improvements in methods of controlling machines for sharpening and setting saw teeth, and more particularly to improvements in the method of stopping machines adapted for sharpening and setting saw teeth, specifically bands of endless saws and disk saws.

In the process of sharpening and setting saw teeth the saw is to be uniformly moved, so that its teeth be successively brought to the position required for working thereof. After a given group of the saw teeth has been worked, the power supply circuit of the machine drive is disconnected, so as to discontinue further movement of the saw. The realization of such a method usually requires the provision of a counter for counting the number of teeth that have been worked, as well as the provision of a special means for determining the number of teeth to be worked. As the number of teeth preset in said means coincides with that registered by the counter, the drive of the machine is disconnected from the power supply source. However, the number of teeth in saw bands, even in case the length of such bands is equal, lies within a range close to a certain average value because of differences in the sizes of the teeth being cut. Thus, for example, for a band 5250 mm. long with a pitch of the saw teeth 10 mm., the number of teeth, with due account of permissible deviations from a preset value for each tooth, will vary from 480 to 540. Since an exact counting of the number of teeth for each band is quite a labour-consuming procedure, an average number of 510 teeth is preset in the means specifying the number of teeth to be worked (this means being termed hereafter an adjuster means), which signifies, that the power supply circuit of the drive will be disconnected when the counter has registered the number of 510 teeth worked. In such a case in a saw having 480 teeth 30 teeth will be worked twice, which may lead to rejects, say, because of an excessive setting thereof, whereas in case of a saw having 540 teeth 30 teeth will be left unworked.

An object of the present invention is to provide such a method of stopping the machine, that the disconnection of the power supply circuit of the machine drive would be determined by the position of the saw band after the last tooth of a preset group thereof has been worked.

Another object of the invention is to simplify the circuit adapted to stop the machine.

Said and other objects of the present invention are accomplished due to the fact, that in the realization of the method of stopping the machine for grinding and setting saw teeth, which are successively brought to the position for being worked by disconnecting the power supply circuit of the machine drive after the working of a preset group of teeth has been accomplished, according to the invention, an electrical-insulation coating is provided on the saw band in the zone of the tooth which is the last in said preset group, and the saw is electrically connected between the power supply source and the drive of the machine by means of a contact slidable along the saw band during its movement in such a fashion, that when said contact runs onto said insulation coating, the power supply circuit of the drive becomes interrupted, and the machine is stopped.

The advantage offered by the present invention resides in that it makes possible to obviate the use of complicated electronic units (such as pickups, counters and adjuster means) employed in conventional devices, and ensures the working of the entire preset group of teeth, precluding the danger of a repeated working of the teeth, or else, of not working all the teeth of a preset group, since in the present method the moment when the machine is stopped is determined not by the number of teeth, which, as has been stated hereinabove, may lead to undesirable results, but by the position of the electrical-insulation coating which can be applied in any place of the saw being worked, where the working thereof is to be discontinued.

Given hereinbelow is a description of an exemplary embodiment, illustrating the way in which the present method can be realized, with reference to the accompanying drawing wherein the principal electric circuit diagram for the realization of the present method is shown.

The circuit shown diagrammatically in FIG. 1 comprises a power supply source 1 of a drive 2 and a relay 3 by means of which the power supply source 1 is connected to the drive 2. In the control circuit of the relay 3 a feeler 4 is inserted, which functions as a contact by means of which the current-conducting band of a saw 5 during its being worked is connected between the source 1 and the relay 2 for controlling the operation of the latter.

On the band of the saw 5 in the zone of the tooth "$n$" where the working of a group of teeth is to be stopped, say, of a group of teeth from "$a$" to "$n$," a current-insulation coating 6 is applied. Such a coating, for example by using a suitable paint, is applied onto the band of the saw being worked at the stage of an intermediate checking prior to the operation of grinding and setting.

The essence of the present method is as follows.

Let it be assumed that in the initial position the contact 4 of the relay was in the zone of the tooth "$a$." When the power supply source 1 is connected, the current flows along the band of the saw 5 via the feeler 4, so that the relay 3 is actuated and the drive is thus coupled to the power supply source. In the course of operation all the teeth from "$z$" to "$n$" (not shown in the figure) are successively brought to the position for working, the saw being moved stepwise over a distance equal to the pitch of the teeth, under the action of a pawl 7 associated with a spring 8 which operate in a ratchet-and-pawl fashion and are driven by the drive 2. Meanwhile the feeler 4 slides along the surface of the saw band. As soon as the feeler 4 in the course of movement of the saw 5 encounters the insulation coating 6, the control circuit of the relay 3 is interrupted, the contacts of the relay break, thereby disconnecting the power supply source from the drive and causing stoppage of the latter; the movement of the saw being worked is thus discontinued.

What is claimed is:
1. A method of stopping the machine adapted for grinding and setting saw teeth by disconnecting the machine drive from its power supply source after a preset group of said saw teeth have successively passed through the position of working thereof, residing in that on the saw band in the zone of the tooth which is the last of the said preset group an electrical-insulation coating is provided; said saw band is electrically connected between said power supply source and said drive by means of a contact which slides along said saw band during the movement of said saw in such a fashion, that as said contact encounters said insulation coating the power supply circuit of the drive becomes interrupted, and the machine is stopped.

References Cited

UNITED STATES PATENTS 2,834,928    5/1958    Carter _____ 318—466

BERNARD STICKNEY, Primary Examiner

U.S. Cl. X.R.

318—466